UNITED STATES PATENT OFFICE.

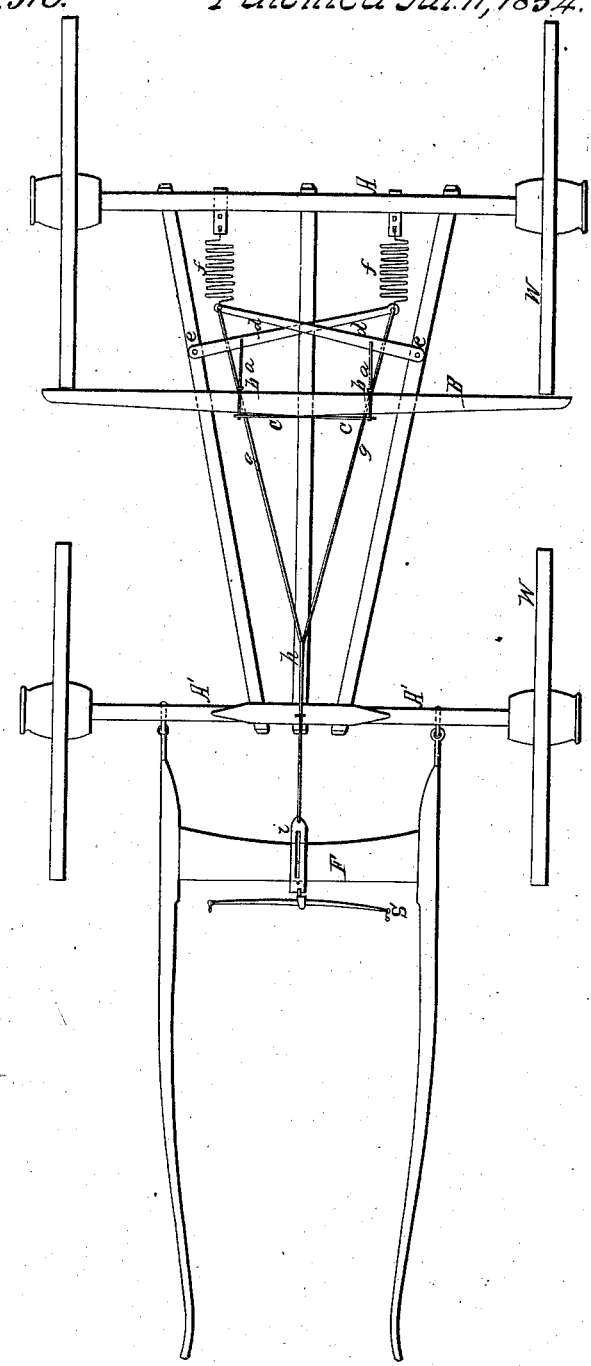

MOSES D. WELLS, OF MORGANTOWN, VIRGINIA.

BRAKE FOR LIGHT VEHICLES.

Specification of Letters Patent No. 11,310, dated July 11, 1854.

*To all whom it may concern:*

Be it known that I, MOSES D. WELLS, of Morgantown, in the county of Monongalia and State of Virginia, have invented a new and useful Improvement in Carriage-Brakes; and I do hereby declare that the following is a full, clear, and exact description of the construction and operation of the same, reference being had to the annexed drawing, forming part of this specification, which represents a plan of the running gear of a carriage having my improved brake attached.

My invention, which is an improvement in self acting brakes for light vehicles, consists in subjecting the brake rubbers to the influence of a peculiar combination of springs actuated as will be hereafter described, and so arranged that when the draft of the animal ceases the rubbers will be drawn against the wheels, from which they will be removed when the draft recommences, the two systems of springs being so arranged with respect to the rubbers that one system will temper the action of the other, preventing within certain limits the direct action of the animal upon the rubbers, and permitting the rubbers to operate notwithstanding the slight movements of the connecting levers caused by inequalities in the road, thereby obviating the constant jerking of the rubbers from the wheels which will always obtain when but a single system of springs is used.

To enable others skilled in the art to make and use my invention I will proceed to describe its construction and operation.

In the drawing A A' are the axles, W the wheels, S the shafts and B the brake bar. This bar is held upon the rods $a$, and is movable between the shoulders $b$ and extremities of the springs $c$. The rods $a$ are attached to the levers $d$, which have their fulcrum at $e$, the extremities of their arms being fastened to the spiral springs $f$ and rods $g$. The springs $c$ are fastened to the middle of the brake bar B, giving the bar a constant tendency toward the wheels W. The springs $f$ are fastened to the rear axle A and drawing the levers $d$ toward that axle produce also the braking action on the bar B. The rods $g$ are attached to the rod $h$ which is fastened to the slotted metal strap $i$, so constructed as to play over the bar F. The swingle tree is fastened to this strap, and when the animal draws, the vehicle is moved by the action of this strap on the bar F. The springs $f$ are attached to the axle A by means of screws, straps, slides or other equivalent device by which the strength of the springs may be regulated to the grade and weight carried.

The operation of my improved brake is as follows—On a level or an ascending grade the draft of the animal through rods $g$ and $h$ moves the extremities of the levers $d$ toward the front of the vehicle, causing the shoulders $b$ of the rods $a$ to press against the rear of the bar B and remove the rubbers from the wheels. But when the vehicle is moving on a descending grade and the draft suspended, the bar B will be acted upon by the combined action of the springs $c$ and $f$ causing the rubbers to press against the wheels and retard the descent of the vehicle without the necessity of any backing action of the animal, or of any operation on the part of the driver. This effect of drawing the rubbers against the wheels when the draft is relaxed, could be produced by means of spiral springs acting through levers directly upon the bar B. But it is obvious that if these springs $f$ acted directly upon the bar B, every jerk of the horse would remove the rubbers from the wheels. It is to prevent this action that I employ the combination which forms the basis of my invention. The springs $c$ by reason of their outer extremities pressing on the levers $d$ through the rods $a$, have a tendency to throw the bar B toward the wheels, assisting to some extent the action of the spiral springs $f$. Therefore, if during the movement of the vehicle the horse should give a slight pull drawing the rods $g$, the levers $d$ will be acted upon, but no effect will be felt by the bar B which will be kept in position by the springs $c$ until the levers $d$ are drawn sufficiently far forward for the shoulders $b$ to press against the bar, when the wheels will be relieved. This tempering of the action of the spiral springs $f$ prevents the continual jerking of the rubbers from the wheels, which would obtain if the movement of the animal acted directly upon the brake bar through the main springs $f$ and levers $d$.

I do not claim the employment of spiral or other springs to draw the rubbers to the wheels, nor do I claim any of the devices embraced in the patent of Elijah Chapman Sept. 26, 1846, or the rejected application of G. Newcomer, and I. M. Ewing.

But what I do claim as my invention and desire to secure by Letters Patent, is

The combination of the two systems of springs $c$ and $f$ with the rods $a$, and levers $d$, for so operating the brake bar, that the movement of the levers $d$ within certain limits, shall have no action on said bar, as, and for the purposes herein fully set forth.

In testimony whereof, I have hereunto signed my name before two subscribing witnesses.

MOSES D. WELLS.

Witnesses:
A. HAYMOND,
J. J. THOMPSON.